(12) United States Patent
Nagatomi et al.

(10) Patent No.: US 7,432,647 B2
(45) Date of Patent: Oct. 7, 2008

(54) LIGHT SOURCE HAVING PHOSPHOR INCLUDING DIVALENT TRIVALENT AND TETRAVALENT ELEMENTS

(75) Inventors: Akira Nagatomi, Tokyo (JP); Masahiro Gotoh, Tokyo (JP); Kenji Sakane, Tokyo (JP); Shuji Yamashita, Tokyo (JP)

(73) Assignees: DOWA Electronics Materials Co., Ltd., Tokyo (JP); Nichia Corporation, Anan-Shi (JP)

( * ) Notice: Subject to any disclaimer, the term of this patent is extended or adjusted under 35 U.S.C. 154(b) by 331 days.

(21) Appl. No.: 10/932,108

(22) Filed: Sep. 2, 2004

(65) Prior Publication Data

US 2006/0006782 A1    Jan. 12, 2006

(30) Foreign Application Priority Data

Jul. 9, 2004    (JP) ............................. 2004-203893

(51) Int. Cl.
*H01J 1/62* (2006.01)
*H01J 63/04* (2006.01)
*C09K 11/02* (2006.01)
*C09K 11/08* (2006.01)

(52) U.S. Cl. ................ 313/503; 313/502; 252/301.4 R; 252/301.4 F

(58) Field of Classification Search ......... 313/501–503; 252/301.4 R, 301.4 F
See application file for complete search history.

(56) References Cited

U.S. PATENT DOCUMENTS

| | | |
|---|---|---|
| 18,985 A | 12/1857 | Olds |
| 2,121,275 A | 6/1938 | Zober et al. |
| 3,527,595 A | 9/1970 | Adler et al. |
| 3,697,301 A | 10/1972 | Donofrio et al. |
| 4,477,689 A | 10/1984 | Ogasahara et al. |

(Continued)

FOREIGN PATENT DOCUMENTS

EP    0 459 156 A2    4/1991

(Continued)

OTHER PUBLICATIONS

K. Uheda et al., "The Crystal Structure and Photoluminescence Properties of a New Red Phosphor, Calcium Aluminum Silicon Nitride Doped With Divalent Euroium," Abs. 2073, 206[th]Meeting., Oct. 3, 2004.

(Continued)

*Primary Examiner*—Toan Ton
*Assistant Examiner*—Bumsuk Won
(74) *Attorney, Agent, or Firm*—Oliff & Berridge, PLC

(57) ABSTRACT

A phosphor having an excitation band relative to lights in the wide range of wavelengths from ultraviolet to visible light, and having an emission spectrum in the red range and so on, with a wide half value width, and an LED and a light source using the phosphor and emitting white and other color lights with good color rendering properties are provided. Powdered raw materials of $Ca_3N_2$ (2N), CaO (2N), AlN (3N), $Si_3N_4$ (3N), and $Eu_2O_3$ (3N) are prepared, and the respective raw materials are mixed to have a mole ratio of the respective elements of Ca:Al:Si:Eu=0.985:1:1:0.015. The mixed raw materials are fired at 1000° C. or higher in an inert atmosphere for three hours, and thereafter pulverized to obtain a phosphor having a composition of $CaAlSiN_{2.83}O_{0.25}$:Eu, which is one example of the phosphor satisfying the above described object. Furthermore, by combining the phosphor with an appropriate LED or a light source emitting from ultraviolet light to visible light, the LED and the light source emitting white and other color lights with good color rendering properties can be obtained.

10 Claims, 3 Drawing Sheets

U.S. PATENT DOCUMENTS

| | | | |
|---|---|---|---|
| 4,576,736 A | 3/1986 | Harmuth | |
| 5,398,398 A | 3/1995 | Williams et al. | |
| 5,447,291 A | 9/1995 | Sandhage | |
| 5,600,202 A | 2/1997 | Yamada et al. | |
| 6,180,029 B1 | 1/2001 | Hampden-Smith et al. | |
| 6,504,297 B1 | 1/2003 | Heo et al. | |
| 6,670,748 B2 | 12/2003 | Ellens et al. | |
| 7,138,756 B2 | 11/2006 | Gotoh et al. | |
| 2002/0043926 A1 | 4/2002 | Takahashi et al. | |
| 2003/0030038 A1 | 2/2003 | Mitomo et al. | |
| 2003/0030368 A1 | 2/2003 | Ellens et al. | |
| 2003/0094893 A1 | 5/2003 | Ellens et al. | |
| 2003/0132422 A1 | 7/2003 | Tian et al. | |
| 2003/0152804 A1 | 8/2003 | Miura et al. | |
| 2003/0213611 A1 | 11/2003 | Morita | |
| 2004/0155225 A1* | 8/2004 | Yamada et al. | 252/301.4 R |
| 2004/0263074 A1 | 12/2004 | Baroky et al. | |
| 2005/0001225 A1 | 1/2005 | Yoshimura et al. | |
| 2005/0189863 A1 | 9/2005 | Nagatomi et al. | |
| 2005/0203845 A1 | 9/2005 | Yoshimine et al. | |
| 2005/0205845 A1 | 9/2005 | Deising et al. | |
| 2005/0253500 A1 | 11/2005 | Gotoh et al. | |
| 2005/0267243 A1 | 12/2005 | Amasaki et al. | |
| 2006/0006782 A1 | 1/2006 | Nagatomi et al. | |
| 2006/0017365 A1 | 1/2006 | Nagatomi et al. | |
| 2006/0021788 A1 | 2/2006 | Kohayashi et al. | |
| 2006/0022573 A1 | 2/2006 | Gotoh et al. | |
| 2006/0033083 A1 | 2/2006 | Sakane et al. | |
| 2006/0043337 A1 | 3/2006 | Sakane et al. | |
| 2006/0045832 A1 | 3/2006 | Nagatomi et al. | |
| 2006/0065878 A1 | 3/2006 | Sakane et al. | |
| 2006/0076883 A1 | 4/2006 | Himaki et al. | |
| 2006/0091790 A1 | 5/2006 | Nagatomi et al. | |
| 2006/0170332 A1 | 8/2006 | Tamaki et al. | |
| 2006/0197432 A1 | 9/2006 | Nagatomi et al. | |
| 2006/0197439 A1 | 9/2006 | Sakane et al. | |
| 2006/0220047 A1 | 10/2006 | Nagatomi et al. | |
| 2006/0220520 A1 | 10/2006 | Sakane et al. | |
| 2006/0244356 A1 | 11/2006 | Nagatomi et al. | |
| 2007/0007494 A1 | 1/2007 | Hirosaki et al. | |
| 2007/0029525 A1 | 2/2007 | Gotoh et al. | |
| 2007/0164308 A1 | 7/2007 | Yoshimura et al. | |

FOREIGN PATENT DOCUMENTS

| | | |
|---|---|---|
| EP | 1 296 376 A2 | 3/2003 |
| EP | 1 445 295 A1 | 8/2004 |
| JP | 05-015655 | 1/1993 |
| JP | 05-198433 | 8/1993 |
| JP | 11-144938 | 5/1999 |
| JP | 11-277527 | 10/1999 |
| JP | 2000-073053 | 3/2000 |
| JP | 2000-153167 | 6/2000 |
| JP | A-2001-214162 | 8/2001 |
| JP | 2002-363554 | 12/2002 |
| JP | 2003-013059 | 1/2003 |
| JP | 2003-096446 | 4/2003 |
| JP | A-2003-124527 | 4/2003 |
| JP | A-2003-515655 | 5/2003 |
| JP | A-2003-277746 | 10/2003 |
| JP | A-2003-336059 | 11/2003 |
| JP | 2004-055910 | 2/2004 |
| JP | 2004-505470 | 2/2004 |
| JP | 2004-067837 | 3/2004 |
| JP | 2004-145718 | 5/2004 |
| JP | 2004-166058 | 6/2004 |
| JP | 2004-189997 | 7/2004 |
| JP | 2004-207271 | 7/2004 |
| JP | A-2004-186278 | 7/2004 |
| JP | 2004-235598 | 8/2004 |
| JP | 2004-248405 | 8/2004 |
| JP | 2004-250920 | 8/2004 |
| JP | 2004-253312 | 8/2004 |
| JP | 2004-244560 | 9/2004 |
| JP | 2004-055536 | 12/2004 |
| JP | 2004-368153 | 12/2004 |
| JP | 2005-075854 | 3/2005 |
| JP | 2005-103429 | 3/2005 |
| JP | 2005-105126 | 3/2005 |
| JP | 2005-192691 | 6/2005 |
| JP | 2005-344025 | 12/2005 |
| JP | 2006-028295 | 2/2006 |
| JP | 2006-063214 | 3/2006 |
| JP | 2006-063286 | 3/2006 |
| JP | 2006-070109 | 3/2006 |
| JP | 2006-176546 | 7/2006 |
| JP | A-2006-282809 | 10/2006 |
| JP | A-2006-282872 | 10/2006 |
| WO | WO 01/40403 A1 | 6/2001 |
| WO | WO 02/11214 A1 | 2/2002 |
| WO | WO 2004/030109 A1 | 4/2004 |
| WO | WO 2004/039915 A1 | 5/2004 |
| WO | WO 2004/055910 A1 | 7/2004 |
| WO | WO 2005/052087 A1 | 6/2005 |
| WO | WO 2006/093298 A1 | 9/2006 |

OTHER PUBLICATIONS

U.S. Appl. No. 11/194,590, filed Aug. 2, 2005.
U.S. Appl. No. 10/984,772, filed Nov. 10, 2004, Nagatomi et al.
U.S. Appl. No. 11/061,669, filed Feb. 22, 2005, Nagatomi et al.
U.S. Appl. No. 11/063,847, filed Feb. 23, 2005, Sakane et al.
U.S. Appl. No. 11/149,317, filed Jun. 10, 2005, Nagatomi et al.
U.S. Appl. No. 11/149,192, filed Jun. 10, 2005, Sakane et al.
U.S. Appl. No. 11/198,281, filed Aug. 8, 2005, Nagatomi et al.
U.S. Appl. No. 11/194,590, filed Aug. 2, 2005, Gotoh et al.
U.S. App. No. 11/211,751, filed Aug. 26, 2005, Sakane et al.
U.S. Appl. No. 11/218,504, filed Sep. 6, 2005, Nagatomi et al.
JIS Z 8726; "Method of Specifying Colour Rendering Properties of Light Sources"; (1990), pp. 381-390.
"Phosphor Handbook"; (compiled by Phosphor Research Society, published by Ohmusha, Ltd., 1987); pp. 172-176.

* cited by examiner

LIGHT SOURCE HAVING PHOSPHOR INCLUDING DIVALENT TRIVALENT AND TETRAVALENT ELEMENTS

BACKGROUND OF THE INVENTION

1. Field of the Invention

The present invention relates to a phosphor used in a display device such as CRT, PDP, FED, and EL, and a lighting device and so on, such as a vacuum fluorescent display and a fluorescent lamp. Especially it relates to the phosphor which is excited by ultraviolet light to visible light to emit visible light or white light, an LED, and a light source using the phosphor.

2. Description of the Related Art

Currently, a discharge fluorescent lamp, a filament lamp, and so on used as lighting devices have various problems such as containing harmful substances like mercury or the like, having a short life span, and so on. However, in resent years, LEDs emitting a blue or ultraviolet light are developed one after another. The ultraviolet to blue lights emitted from the LED are combined with a phosphor having an excitation band within a ultraviolet to blue wavelength region, and thereby a white light is obtained by mixing the LED emitting light and emission of the phosphors. Then, researches and developments to utilize the white light as a lighting of the next generation are being conducted vigorously. This white LED lighting has advantages such as the amount of heat generation is small, the life span is long without being broken like a conventional filament lamp because it is constituted from a semiconductor element and the phosphor, and the harmful substance such as mercury is not necessary, so that it is an ideal lighting device.

Here, to obtain white light by the combination of the above-described LED and the phosphor, two modes are considered in general. One mode is to combine an LED emitting blue light and a phosphor excited by receiving the blue light emission to emit yellow light, and by the combination of blue light emission and yellow light emission, white light emission is obtained.

The other mode is to combine an LED emitting a near-ultraviolet or ultraviolet light, and a phosphor excited by receiving the near-ultraviolet or ultraviolet light emission to emit a red (R) light, a phosphor emitting a green (G) light, a phosphor emitting a blue (B) light, and other colors, and thereby obtaining white light emission by RGB and other color lights. This method to obtain white light emission by using RGB and other color lights has a wide range of application as a lighting device because any light emitting color other than white light can be obtained by the combination and the compounding ratio of RGB and other color phosphors. As phosphors used for this purpose, there are red phosphors of, for example, $Y_2O_2S:Eu$, $La_2O_2S:Eu$, $3.5MgO \cdot 0.5MgF_2 \cdot GeO_2:Mn$, and $(La, Mn, Sm)_2O_2S \cdot Ga_2O_3:Eu$, green phosphors of, for example, $ZnS:Cu, Al$, $SrAl_2O_4:Eu$, and $BAM:Eu, Mn$, a yellow phosphor of, for example, $YAG:Ce$, and blue phosphors of, for example, $BAM:Eu$, $Sr_5(PO_4)_3Cl:Eu$, $ZnS:Ag$, $(Sr, Ca, Ba, Mg)_{10}(PO_4)_6Cl_2:Eu$. And those RGB and other color phosphors are combined with light emitting portions such as the LED and so on emitting a near-ultraviolet or ultraviolet light in an attempt to obtain a light source or a lighting device such as the LED and so on which emits white or a desired light.

However, as for the white LED lighting by the combination of blue LED and the yellow phosphor (YAG:Ce), the light emission at the long wavelength side in the visible light region is in shortage, so that the white light emission becomes slightly blue-tinged, and the somewhat red-tinged white light emission like an electric bulb cannot be obtained.

Besides, in the white LED lighting by the combination of near-ultraviolet or ultraviolet LED, and RGB and other color phosphors, the excitation efficiency on the long wavelength side of the red phosphor is not good compared to the other phosphors within the three color phosphors, so that the emission efficiency is low. Therefore there is no other choice than to increase the compounding ratio of only the red phosphor, and the phosphor to increase the luminance is in shortage, so that the white light with high luminance cannot be obtained. Furthermore, the emission spectrum of the phosphor is sharp, so that there is a problem that the color rendering properties of the obtained light is not good.

Therefore, recently, an oxynitride glass phosphor (for example, refer to Patent Document 1) having a good excitation on the long wavelength side and obtaining a light emitting peak with a wide half value width, a phosphor having a sialon as a host material (for example, refer to Patent Documents 2 and 3), and a phosphor containing nitrogen such as silicon nitride group or the like (for example, refer to Patent Documents 4 and 5) are reported. Since the phosphor containing nitrogen has more covalent bonding ratio compared to the oxide type phosphor, the phosphor has a characteristic of having a good excitation band for the lights having 400 nm wavelength or more, and it comes under the spotlight as the phosphor for the white LED.

[Patent Document 1] Japanese Patent Application Laid-open No. 2001-214162

[Patent Document 2] Japanese Patent Application Laid-open No. 2003-336059

[Patent Document 3] Japanese Patent Application Laid-open No. 2003-124527

[Patent Document 4] Translated National Publication of Patent Application No. 2003-515655

[Patent Document 5] Japanese Patent Application Laid-open No. 2003-277746

SUMMARY OF THE INVENTION

However, by the investigation of the inventors of the present invention, the problem is found that the color rendering properties are still below the satisfaction level even in white light obtained by the combination of the near-ultraviolet or ultraviolet LED and so on, and the RGB and other color phosphors. In addition, it is conceivable that the light source such as LED and so on emitting white light and other various color lights with good color rendering properties are required in the future. However, only red phosphors according to the prior art having an excitation band in the wavelength region of ultraviolet light, or from ultraviolet light to blue light, has been developed.

Here, the inventors of the present invention researched solutions of the above-described problems. As a result, it is found that if a red phosphor and so on, having an excitation band for the lights in the wide range of wavelength from ultraviolet to visible light (for example, green light) and having an emission spectrum with a wide half value width in the range of red or the like is obtained, it becomes possible to combine the red phosphor and so on with various other color phosphors and with various light sources (for example, light sources from ultraviolet light to green light), and white and other various color light emissions with a good color rendering properties can be obtained.

That is to say, an object of the present invention is to provide a phosphor having the excitation band for lights in the wide range of wavelength from ultraviolet to green light, and having the emission spectrum in the range of red and so on, with a wide half value width, and the LED and the light source using the phosphor.

According to a first aspect for solving the above-described problems, a phosphor emitting a light when a monochromatic excitation light in a range from 250 nm to 550 nm is irradiated thereon is provided, wherein a luminescence intensity at an excitation wavelength where an intensity of a spectrum of emitting the light by absorbing the excitation light becomes maximum is defined as $P_H$, a luminescence intensity at an excitation wavelength where the luminescence intensity becomes minimum is defined as $P_L$, and $P_H/P_L \leq 2$.

According to a second aspect of the present invention, the phosphor described in the first aspect is provided, wherein an emission maximum of the spectrum of emitting the light is in a range of 580 nm or more and 680 nm or less, and a half value width of the spectrum of emitting the light is 50 nm or more.

According to a third aspect of the present invention, the phosphor described in the first or the second aspect is provided, wherein the phosphor is represented by a composition formula MmAaBbOoNn:Z (note that the element M is one or more kind of divalent elements, the element A is one or more kind of trivalent elements, the element B is one or more kind of tetravalent elements, the O is oxygen, the N is nitrogen, and the element Z is an activator.).

According to a fourth aspect of the present invention, the phosphor described in the first or the second aspect is provided, wherein the phosphor is represented by a composition formula MmAaBbNn:Z (note that the element M is one or more kind of divalent elements, the element A is one or more kind of trivalent elements, the element B is one or more kind of tetravalent elements, the N is nitrogen, and the element Z is the activator.).

According to a fifth aspect of the present invention, the phosphor described in the first or the second aspect is provided, wherein the phosphor is represented by a composition formula MmBbOoNn:Z (note that the element M is one or more kind of divalent elements, the element B is one or more kind of tetravalent elements, the O is oxygen, the N is nitrogen, and the element Z is the activator.).

According to a sixth aspect of the present invention, a light emitting diode is provided, which includes;

a phosphor according to any one of the first to the fifth aspect; and a light emitting portion emitting any one of ultraviolet to green lights, wherein the phosphor is light emitted by any one of the ultraviolet to green lights as an excitation source.

According to a seventh aspect of the present invention, the light emitting diode described in the sixth aspect is provided, wherein the ultraviolet to green lights are the lights of wavelengths from 250 nm to 550 nm.

According to an eighth aspect of the present invention, a light source is provided, which includes, a phosphor according to any one of the first to the fifth aspect, and a light emitting portion emitting any one of ultraviolet to green lights, wherein the phosphor is light emitted by any one of the ultraviolet to green lights as the excitation source.

According to a ninth aspect of the present invention, the light source described in the eighth aspect is provided, wherein the ultraviolet to green lights are lights of wavelengths from 250 nm to 550 nm.

The phosphor according to the first to fifth aspects, having the emission spectrum in the range of red and so on, with a wide half value width, and having the excitation band in the range of ultraviolet light to green light (wavelength region from 250 nm to 550 nm), so that the combination with phosphors of various other colors and with various light sources becomes possible, and white and other color light emissions with good color rendering properties can be obtained.

In the light emitting diode according to the sixth or the seventh aspect, the light emitted by the light emitting element of the light emitting diode is combined with the light emission of the phosphor, so that white and other color light emissions with good color rendering properties can be obtained.

In the light source according to the eighth or the ninth aspect, the light emitted by the light emitting portion of the light source is combined with the light emission of the phosphor, so that white and other color light emissions with good color rendering properties can be obtained.

DETAILED DESCRIPTION OF THE PREFERRED EMBODIMENTS

Figure 1:
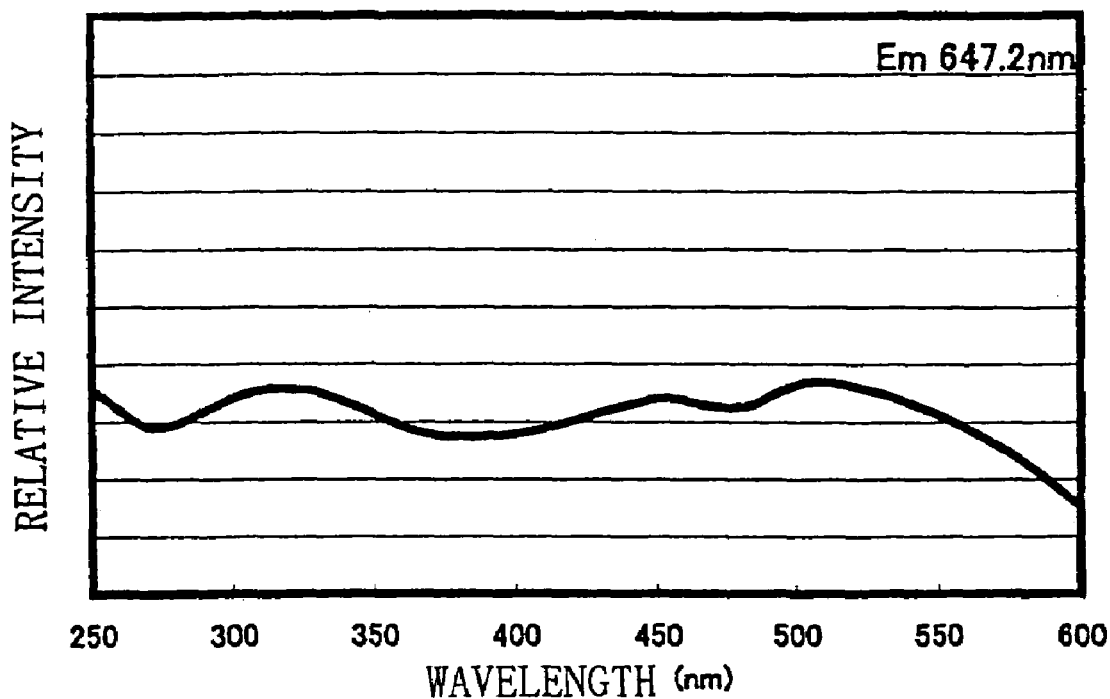
FIG. 1 is a graph showing an excitation spectrum of a phosphor according to the present invention.

Hereinafter, the best mode for carrying out the invention will be described based on embodiments 1 to 3.

Embodiment 1

Here, a characteristic of a phosphor represented by a composition formula MmAaBbOoNn:Z (note that the element M is one or more kind of divalent elements, the element A is one or more kind of trivalent elements, the element B is one or more kind of tetravalent elements, the O is oxygen, the N is nitrogen, and the element Z is an activator) according to the present invention will be described with reference to the drawing.

First, an excitation light which can be used by a red phosphor according to an embodiment 1 is described with reference to FIG. 1. FIG. 1 is a graph showing an excitation spectrum of an example ($CaAlSiN_{2.83}O_{0.25}$:Eu) of the red phosphor according to the embodiment 1, and a luminescence intensity of the phosphor is taken on the vertical axis and a wavelength (nm) of the excitation light is taken on the horizontal axis.

The excitation spectrum of the phosphor is obtained as follows.

First, an emission maximum of the spectrum of emitting the light when the phosphor is excited by the excitation light of 460 nm is searched, and then it was 647.2 nm. Next, monochromatic excitation lights are irradiated on the phosphor while changing the wavelength sequentially from 250 nm to 600 nm. Then the intensity of the spectrum emitted by the phosphor at the 647.2 nm is measured, and the luminescence intensity is plotted.

As it is obvious from FIG. 1, the red phosphor according to the embodiment 1 shows a plain light emission at substantially the same luminescence intensity relative to the excitation lights in the range from ultraviolet light of 250 nm to green light of 550 nm.

Next, the light emission when the red phosphor according to the above-described embodiment 1 is excited by the excitation light in the range from ultraviolet light of 250 nm to green light of 550 nm is described.

The emission maximum, a relative luminescence intensity, and a value of a half value width of the phosphor according to the embodiment 1, when it is excited by the lights having wavelengths of 254 nm, 300 nm, 380 nm, 405 nm, 460 nm, 508.7 nm, and 550 nm as the excitation lights are shown in Table 1.

TABLE 1

| EXCITATION WAVELENGTH (nm) | EMISSION MAXIMUM (nm) | RELATIVE INTENSITY (%) | HALF VALUE WIDTH (nm) |
| --- | --- | --- | --- |
| 254.0 | 645.9 | 89.3% | 93.3 |
| 300.0 | 645.9 | 89.3% | 93.3 |
| 380.0 | 645.8 | 72.9% | 94.6 |
| 405.0 | 645.9 | 75.2% | 94.2 |
| 460.0 | 647.2 | 91.7% | 91.5 |
| 508.7 | 648.9 | 100.0% | 89.6 |
| 550.0 | 650.4 | 95.5% | 88.0 |

As it is obvious from measured results shown in Table 1, when the lights having wavelengths from 250 nm to 550 nm are sequentially irradiated on the phosphor as monochromatic excitation lights, the maximum of luminescence intensities is defined as $P_H$, and the minimum of luminescence intensities is defined as $P_L$. When the wavelength of the excitation light is 508.7 nm, the emission maximum becomes 648.9 nm, and the luminescence intensity becomes a maximum value. Therefore, the value at this time is set as $P_H=100\%$. On the other hand, when the wavelength of the excitation light is 380.0 nm, the emission maximum becomes 645.8 nm, and the luminescence intensity becomes a minimum value. Then, the value at this time is $P_L=72.9\%$. Therefore, $P_H/P_L=1.37$, and when a case that the excitation light is used to provide the maximum efficiency to the phosphor is compared to a case that the excitation light is used to provide the minimum efficiency, the difference between both efficiencies is within 30%. Therefore it turned out that the phosphor can fully use the wide range of lights effectively from ultraviolet light to green light as the excitation lights. Further, it also turned out that the half value width is 88 nm or more relative to the excitation lights having wavelengths from 250 nm to 550 nm.

That is to say, the red phosphor according to the embodiment 1 can use various light sources producing any one of light emissions from ultraviolet light to green light as the light source for excitation. Further, when it is used by mixing with other color phosphors emitting other color lights, it can be used in a wide range, flexibly, by mixing with other color phosphors having various excitation spectra respectively. By a combination with the various light sources and other color phosphors, white light and other various lights having good color rendering properties can be obtained.

Next, a structure of the phosphor according to the embodiment 1 is described.

The phosphor according to the embodiment 1 is the phosphor having a host material structure represented by the composition formula MmAaBbOoNn:Z. Here, the element M is at least one or more kind of elements selected from the divalent elements in the phosphor. The element A is at least one or more kind of trivalent elements in the phosphor. The element B is at least one or more kind of tetravalent elements in the phosphor. The O is oxygen, and the N is nitrogen. The element Z is an element which acts as an activator in the phosphor, and at least one or more kind of elements selected from rare-earth elements or transition metal elements.

When the host material structure of the above-described phosphor has a chemically stable structure, an impurity phase which does not contribute to a light emission is difficult to arise in the host material structure, therefore it is a preferable composition inhibiting the deterioration of the light emitting characteristics. Therefore, the host material structure of the phosphor is preferable to be a structure which is represented by "n=2/3 m+a+4/3b−2/3o" being the above-described composition formula MmAaBbOoNn:Z, so that the host material structure of the phosphor has a chemically stable structure.

Further, in the phosphor having the host material structure of the above-described composition formula MmAaBbOoNn:Z, the element M is a plus divalent element, the element A is a plus trivalent element, the element B is a plus tetravalent element, oxygen is a minus divalent element, and nitrogen is a minus trivalent element, so that it becomes "m=a=b=1" which makes the host material structure of the phosphor becomes more stable chemical compound, and thus it is preferable. In this case, the preferable range of the content of nitrogen in the chemical compound is defined by the content of oxygen in the host material structure. When "m=a=b=1", the range is represented by "n=3−2/3o" (note that "0 (zero)≦o≦1"). However, in any case, a slight displacement of the composition from the composition formula of the host material structure can be allowed.

On the occasion of producing a phosphor sample according to the embodiment 1, as raw materials of the element M (plus divalent), the element A (plus trivalent), and the element B (plus tetravalent), the chemical compound of either a nitride or an oxide thereof may be used. For example, the nitride ($M_3N_2$)/oxide (MO) of the element M, the nitrides (AN, $B_3N_4$) of the element A and the element B may be used and mixed together. By controlling the compounding ratio of both of the nitride and the oxide, the oxygen amount and the nitrogen amount in the course of sampling can be controlled without changing the value of "m". Of course, the nitride and the oxide do not mean to limit to a chemical compound combined only with oxygen and a chemical compound combined only with nitrogen, but they mean, for example, a chemical compound including a corresponding element such as carbonate, oxalate, or the like, which decomposes during firing and practically becomes the oxide, and oxygen, and also the nitride means a chemical compound including the element and nitrogen. However, in the following explanation, the oxide of the element as a chemical compound including the element and oxygen, and the nitride of the element as a chemical compound including the element and nitrogen are explained as examples, for convenience.

For example, when the conditions of weighing are "m=a=b=1" and the mole ratio of oxygen being "o=0.25", the respective raw materials may be weighed with the mole ratio of "$M_3N_2$:MO:AN:$B_3N_4$=0.75:0.75:3:1", but it may also be weighed with the mole ratio of "$M_3N_2:AN:A_2O_3:B_3N_4=1:2.5:0.25:1$". Furthermore, at this time, when the element Z being the activator is, for example, a divalent element, the element Z substitute a part of the element M. Therefore when it is represented by MmAaBbOoNn: Zz considering this substitution, "$(m+z)=a=b=1$" is preferable. Thus, the host material structure of the phosphor sample is able to have the chemically stable structure, and the phosphor with high efficiency and high luminance can be obtained.

The element M is preferable to be at least one or more elements selected from Be, Mg, Ca, Sr, Ba, Zn, Cd, and Hg, and moreover, it is preferable to be at least one or more elements selected from Mg, Ca, Sr, Ba, and Zn.

The element A is preferable to be at least one or more elements selected from trivalent elements such as B (boron), Al, Ga, In, Tl, Y, Sc, P, As, Sb, and Bi, and moreover, it is preferable to be Al. As Al, AlN being the nitride is used as a general heat conductive material and a structural material, so it is easy to obtain and low in price, and in addition, an environmental load thereof is low. Therefore it is preferable.

The element B is preferable to be at least one or more elements selected from tetravalent elements such as C, Si, Ge, Sn, Ti, Hf. Mo, W, Cr, Pb, and Zr, and moreover, it is preferable to be Si. As Si, $Si_3N_4$ being the nitride is used as the general heat conductive material and the structural material, so it is easy to obtain and low in price, and in addition, an environmental load thereof is low. Therefore it is preferable.

The element Z is preferable to be at least one or more elements selected from the rare-earth elements or the transition metal elements, but the light emission of the phosphor is preferable to be a spectrum with a wide half value width so that, for example, the white light source and the white LED, using the phosphor exhibit the color rendering properties. From this point of view, the element Z is preferable to be at least one or more elements selected from Eu, Mn, Sm, and Ce. Above all, if Eu is used, the phosphor shows a strong light emission from orange to red, so that the emission efficiency and the color rendering properties become high, and it is more preferable as the activator of the phosphor for the white illumination and the white LED.

Incidentally, depending on the type of the element Z which substitute a part of the element M in the host material structure of the phosphor, the phosphor emitting the lights of a different wavelength can be obtained.

By the element M, the element A, the element B, and the element Z having the above-described structure, the luminescence intensity and the luminance of the phosphor become high.

When the phosphor according to the embodiment 1 is used in a powder form, the average particle size of the phosphor powder is preferable to be 20 μm or smaller. This is because the light emission of the phosphor powder is considered to be produced mainly on the particle surface, and therefore, if the average particle size is 20 μm or smaller, a surface area per a powder unit weight can be secured and the deterioration of the luminance can be avoided. In addition, when the powder is turned into a paste form and it is coated on the light emitting element and so on, the density of the powder can be increased, and also from this point of view, the deterioration of the luminance can be avoided. Besides, by the investigation of the inventors of the present invention, it also turned out that the average particle size is preferable to be 0.1 μm or larger from the point of view of the emission efficiency of the phosphor powder, though the detailed reason is not clear. From the reasons stated above, the average particle size of the phosphor powder according to the embodiment 1 is preferable to be 0.1 μm or larger and 20 μm or smaller.

As is described above, the phosphor according to the embodiment 1 has a good excitation band in the wide range from ultraviolet light to green light (wavelength region from 250 nm to 550 nm), and the light emission of the phosphor is the spectrum with a wide half value width. Therefore by the combination with the light emitting portion emitting ultraviolet light to green light, the light source and the LED of monochromatic or white color with high luminance and good color rendering properties and further a lighting unit including those can be obtained.

Next, an example of producing method of the phosphor according to the embodiment 1 is described using $CaAlSiN_{2.83}O_{0.25}$:Eu (note that "$z/(m+z)=0.015$") as an example.

First, an oxide type raw material and a nitride type raw material of the element M, the nitride type raw material of the element A, and the nitride type raw material of the element B are prepared. Incidentally, the oxide type raw material of the element A and/or that of the element B may be used if desired.

The respective oxide type raw materials and nitride type raw materials may be commercially available raw materials. Since they are preferred to have high purity, raw materials of 2N or higher, or more preferably 3N or higher are prepared. Generally, the particle size of the respective raw material particles are preferable to be fine particles from the point of view of enhancing the reaction, but the particle size and the form of the obtained phosphor will change depending on the particle size and form of the raw materials. Therefore, in accordance with the required particle size of the finally obtained phosphor, the nitride type raw material and the oxide type raw material having approximate particle size may be prepared.

A raw material of the element Z may be a commercially available oxide type raw material. Since it is preferred to have high purity, a raw material of 2N or higher, or more preferably 3N or higher is prepared. Incidentally, the oxygen contained in the oxide type raw material of the element Z is also supplied to the master composition of the phosphor, so that when composition of the above-described element M raw material, element A raw material, and element B raw material is studied, the amount of oxygen supplied from the oxide type raw material is preferable to be considered.

In the production of $CaAlSiN_{2.83}O_{0.25}$:Eu (note that it is set as "$z/(m+z)=0.015$"), as two kinds of the nitride and the oxide of the element M and the nitride of the element A and element B, for example, $Ca_3N_2$ (2N), CaO (2N), AlN (3N), and $Si_3N_4$ (3N) may be prepared respectively. As the element Z, $Eu_2O_3$ (3N) may be prepared.

The respective raw materials are weighed and mixed so that these raw materials have the mole ratio of the respective elements becomes "$m:a:b:z=0.985:1:1:0.015$".

The weighing and mixing of the materials are convenient to be operated in the glove box under an inert atmosphere. If the operation is performed in the atmosphere, the oxygen concentration ratio contained in the host material structure elements is broken by the oxidization or the decomposition of the sample, so that the light emitting characteristic is possible to be deteriorated, and in addition, it is possible to cause a problem of being displaced from the objective composition of the phosphor. Besides, the nitrides of the respective raw material elements are easy to be influenced by moisture, so that it is preferable to use an inert gas in which the moisture is fully removed. When the nitride type raw materials are used as the respective raw material elements, a dry mixing is preferable as the mixing method so as to avoid the decomposition of the raw materials, and it may be a normal dry mixing method using a ball mill, a mortar, or the like.

When the mixture is completed, the raw materials are put into a crucible, then retained and fired for three hours in the inert atmosphere of nitrogen or the like, at 1000° C. or higher, preferably at 1400° C. or higher, and more preferably at 1500° C. At this time, the material of the crucible to be used is preferable to be a material which is possible to be used in the inert atmosphere such as boron nitride (BN), alumina, carbon, silicon nitride, aluminum nitride, sialon, SiC, and so on, and the purity of the crucible is preferred to be high. For example, the BN crucible in high purity is preferable. The higher the firing temperature is, the faster the firing proceeds, so the retaining time can be shorten. Even if the firing temperature is low, the objective light emitting characteristic can be obtained by retaining the material for a long time. The longer the firing time is, the more the particle growth proceeds, and the particle size becomes large, so that a desired firing time can be set according to the objective particle size. After the firing is completed, the fired materials are put out of the crucible, and they are pulverized to be a predetermined average particle size by using a pulverizing means such as a mortar, a ball mill, or the like to thereby produce the phosphor having the composition formula $CaAlSiN_{2.83}O_{0.25}$:Eu.

(Application Method for an LED or a Light Source)

When an LED as a light source which emits white light or the like for example is produced by using the powdered phosphor according to the embodiment 1, for example, a BAM:Eu being a commercially available blue phosphor and, for example, a ZnS:Cu, Al being a commercially available green phosphor mixed at a predetermined ratio. The predetermined ratio can be determined by preparing mixed samples of the respective phosphors at the compounding ratio obtained by defining an objective color temperature (for example, 6500 K) and performing the combination simulation of the emission spectrum waveforms of the respective phosphors, and then light emitting the mixed samples and readjusting the mixture ratio from the result of the light emission. The above-described phosphor mixture may be filled to the ultraviolet, ultraviolet to blue, ultraviolet to green, or green LED by the publicly known method. The LED emitting white and other various lights with good color rendering properties can be produced by this way. Also when other light sources are used instead of the LED, the light sources emitting white and other various lights with good color rendering properties can be produced by the same operation.

Embodiment 2

Next, a phosphor represented by a composition formula MmAaBbNn:Z (note that the element M is one or more kind of divalent element, the elements A is one or more kind of trivalent elements, the element B is one or more kind of tetravalent elements, the N is nitrogen, and the element Z is an activator.) according to an embodiment 2 will be described with reference to the drawing.

Figure 2:
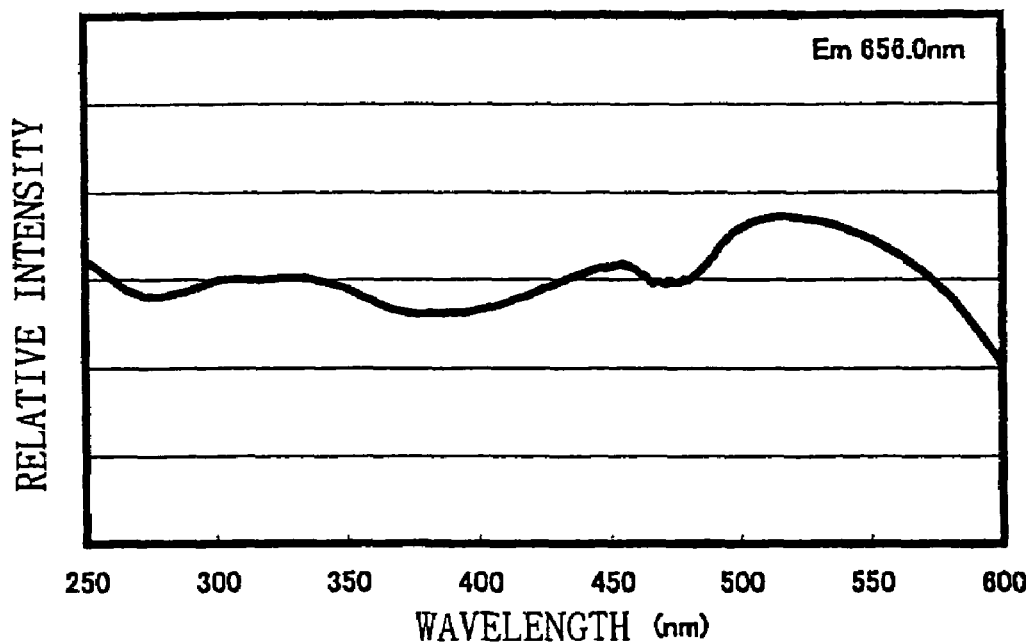
FIG. 2 is a graph showing the excitation spectrum of the phosphor according to the present invention.

First, an excitation light which can be used by a red phosphor according to the embodiment 2 is described with reference to FIG. 2. FIG. 2 is the similar kind of graph of an excitation spectrum described in the embodiment 1, and showing the excitation spectrum of an example ($CaAlSiN_3$:Eu) of the red phosphor according to the embodiment 2. (Note that when the phosphor is excited by an excitation light of 460 nm, the emission maximum was 656.0 nm in this embodiment, so that monochromatic excitation lights are irradiated on the phosphor while changing the wavelength sequentially from 250 nm to 600 nm, then the intensity of the spectrum being light emitted by the phosphor when the wavelength is 656.0 nm is measured, and the luminescence intensity is plotted.)

As it is obvious from FIG. 2, the red phosphor according to the embodiment 2 also shows a plain light emission at substantially the same luminescence intensity relative to the excitation lights in the range from ultraviolet light of 250 nm to green light of 550 nm similar to the phosphor according to the embodiment 1.

Next, the light emission when the above-described red phosphor according to the embodiment 2 is excited by the excitation light in the range from ultraviolet light of 250 nm to green light of 550 nm h is described.

The emission maximum, a relative luminescence intensity, and a value of a half value width of the phosphor according to the embodiment 2, when it is excited by the lights having wavelengths of 254 nm, 300 nm, 380 nm, 405 nm, 460 nm, 516.2 nm, and 550 nm as the excitation lights are shown in Table 2.

TABLE 2

| EXCITATION WAVELENGTH (nm) | EMISSION MAXIMUM (nm) | RELATIVE INTENSITY (%) | HALF VALUE WIDTH (nm) |
|---|---|---|---|
| 254.0 | 656.0 | 93.3% | 87.5 |
| 300.0 | 656.0 | 83.8% | 88.0 |
| 380.0 | 656.5 | 72.8% | 86.7 |
| 405.0 | 655.9 | 74.2% | 87.6 |
| 460.0 | 656.0 | 86.8% | 87.3 |
| 516.2 | 657.5 | 100.0% | 86.5 |
| 550.0 | 658.4 | 95.0% | 85.5 |

As it is obvious from measured results shown in Table 2, when the lights having wavelengths from 250 nm to 550 nm are sequentially irradiated on the phosphor as a monochromatic excitation light, the maximum of luminescence intensities is defined as $P_H$, and the minimum of luminescence intensities is defined as $P_L$. When the wavelength of the excitation light is 516.2 nm, the emission maximum becomes 657.5 nm, and the luminescence intensity becomes a maximum value. Therefore, the value at this time is set as $P_H$=100%. On the other hand, when the wavelength of the excitation light is 380.0 nm, the emission maximum becomes 656.5 nm, and the luminescence intensity becomes a minimum value. Then the value at this time is $P_L$=72.8%. Therefore, $P_H/P_L$=1.37, and when a case that the excitation light is used to provide a maximum efficiency to the phosphor is compared to a case that the excitation light is used to provide a minimum efficiency, the difference between both efficiencies is within 30%. Therefore it turned out that the phosphor can fully use the wide range of lights effectively from ultraviolet light to green light as the excitation lights. Further, it turned out that the half value width is 85 nm or more relative to the excitation lights having wavelengths from 250 nm to 550 nm.

That is to say, it turned out that the red phosphor according to the embodiment 2 can also use various light sources emitting a light of any one of the light from ultraviolet light to green light as a light source for excitation similarly to the phosphor according to the embodiment 1. Further, when it is used by mixing with other color phosphors emitting other color lights, it can be used in a wide range, flexibly, by mixing with other color phosphors having various excitation spectra respectively. By a combination with the various light sources and other color phosphors, white light and other various lights having good color rendering properties can be obtained.

Next, a structure of the phosphor according to the embodiment 2 is described.

The phosphor according to the embodiment 2 is the phosphor having a quaternary host material structure represented by the composition formula MmAaBbNn:Z when it is represented by a general formula. Here, the element M is at least one or more kind of elements selected from the divalent elements in the phosphor. The element A is at least one or more kind of trivalent elements in the phosphor. The element B is at least one or more kind of tetravalent elements in the phosphor. The N is nitrogen. The element Z is an element which acts as an activator in the phosphor, and at least one or more kind of elements selected from rare-earth elements or transition metal elements. When the host material structure of the phosphor has a chemically stable structure, an impurity phase which does not contribute to a light emission is difficult to arise in the host material structure, therefore it is a preferable composition inhibiting the deterioration of the light emitting characteristics. Therefore, the host material structure of the above-described phosphor is preferable to be a structure which is represented by "n=2/3 m+a+4/3b" being the above-described composition formula MmAaBbNn:Z, so that the host material structure of the phosphor have a chemically stable structure.

Further, in the phosphor having the host material structure of the above-described composition formula MmAaBbNn:Z, the element M is a plus divalent element, the element A is a plus trivalent element, the element B is a plus tetravalent element, and nitrogen is a minus trivalent element so that it becomes "m=a=b=1", and the composition does not contain oxygen, which make the host material structure of the phosphor become more stable chemical compound, and therefore it is preferable. However, in any case, a slight displacement from the composition formula of the host material structure can be allowed.

On the occasion of producing a phosphor sample according to the embodiment 2, as raw materials of the element M (plus divalent), the element A (plus trivalent), and the element B (plus tetravalent), either the respective nitrides or metal may be used. For example, the metal of the element M or the nitride ($M_3N_2$) of the element M, the nitrides (AN, $B_3N_4$) of the element A and the element B may be used and mixed together. Of course, the nitride does not mean to limit to a chemical compound combined only with nitrogen, but it means a chemical compound including a corresponding element and nitrogen such as imide, for example, which decomposes during firing and practically becomes a nitride. However, in the following explanation, the nitride of the element as a chemical compound including the element and nitrogen are explained as an example, for convenience.

For example, in the production of $CaAlSiN_3$:Eu, as the nitrides of the element M, the element A, and the element B, $Ca_3N_2$ (2N), AlN (3N), $Si_3N_4$ (3N) may be prepared respectively. As the element Z, $Eu_2O_3$ (3N) may be prepared. The respective nitrides may be a commercially available raw material. Since they are preferred to have high purity, raw materials of 2N or higher, or more preferably 3N or higher are prepared. As the raw material of the element Z, an oxide may be prepared, which may be a commercially available raw material. Since it is preferred to have high purity, a raw material of 2N or higher, or more preferably 3N or higher is prepared.

The respective raw materials may be weighed with the mole ratio of "$M_3N_2$:AN:$B_3N_4$=1:3:1". Furthermore, at this time, when the element Z being an activator is for example a divalent element, the element Z substitute a part of the element M. Therefore when it is represented by MmAaBbNn: Zz considering this substitution, "(m+z)=a=b=1" is preferable. Thus, the host material structure of the phosphor sample is able to have a chemically stable structure, and a phosphor with high efficiency and high luminance can be obtained.

The element M is preferable to be at least one or more elements selected from Be, Mg, Ca, Sr, Ba, Zn, Cd, and Hg, and moreover, it is preferable to be at least one or more elements selected from Mg, Ca, Sr, Ba, and Zn. For example, it can be a single Ca, or a mixture of Ca, Sr, and so on.

The element A is preferable to be at least one or more elements selected from trivalent elements such as B (boron), Al, Ga, In, Tl, Y, Sc, P, As, Sb, and Bi. For example, it can be a single Al, or a mixture of Al, Ga, and so on. It is more preferable to be Al. As Al, AlN being the nitride is used as a general heat conductive material and a structural material, so it is easy to obtain and low in price, and in addition, an environmental load thereof is low. Therefore it is preferable.

The element B is preferable to be at least one or more elements selected from tetravalent elements such as C, Si, Ge, Sn, Ti, Hf, Mo, W. Cr, Pb, and Zr. For example, it can be a single Si, or a mixture of Si, Ge, and so on. It is more preferable to be Si. As Si, $Si_3N_4$ being the nitride is used as the general heat conductive material and the structural material, so it is easy to obtain and low in price, and in addition, an environmental load thereof is low. Therefore it is preferable.

The element Z is preferable to be at least one or more elements selected from rare-earth elements or transition metal elements, but the light emission of the phosphor is preferable to be a spectrum with a wide half value width so that, for example, a white light source and a white LED using the phosphor exhibit the color rendering properties. From this point of view, the element Z is preferable to be at least one or more elements selected from Eu, Mn, and Ce. Above all, if Eu is used, the phosphor shows a strong light emission from orange to red, so that the emission efficiency and the color rendering properties become high, and it is more preferable as the activators of the phosphor for a white illumination and a white LED.

Incidentally, depending on the type of the element Z which substitutes a part of the element M in the host material structure of the phosphor, the phosphor emitting lights of different wavelengths can be obtained.

By the element M, the element A, the element B, and the element Z having the above-described structure, the luminescence intensity and the luminance of the phosphor become high.

When the phosphor according to the embodiment 2 is used in a powder form, the average particle size of the phosphor powder is preferable to be 20 μm or smaller. This is because the light emission of the phosphor powder is considered to be produced mainly on the particle surface, and therefore, when the average particle size is 20 μm or smaller, a surface area per a powder unit weight can be secured and the deterioration of the luminance can be avoided. In addition, when the powder is turned into a paste form and it is coated on the light emitting element and so on, the density of the powder can be increased, and the deterioration of the luminance can be avoided also from this point of view. Besides, by the investigation of the inventors of the present invention, it also turned out that the average particle size is preferably to be 0.1 μm or larger from the point of view of the emission efficiency of the phosphor powder, though the detailed reason is not clear. From the reasons stated above, the average particle size of the phosphor powder according to the embodiment 2 is preferably to be 0.1 μm or larger and 20 μm or smaller.

As described above, the phosphor according to the embodiment 2 has a good excitation band in the wide range from ultraviolet light to green light (wavelength region from 250 nm to 550 nm), and the light emission of the phosphor is a spectrum with a wide half value width. Therefore by the combination with a light emitting portion emitting ultraviolet to green light, a light source and an LED of monochromatic or white color with high luminance and good color rendering properties and in addition, a lighting unit including these can be obtained.

Next, an example of producing method of the phosphor of $CaAlSiN_3$:Eu according to the embodiment 2 is described. In the production of $CaAlSiN_3$:Eu (note that it is set as "z/(m+z)=0.015"), as nitrides of the element M, the element A, and the element B, for example, $Ca_3N_2$ (2N), AlN (3N), and $Si_3N_4$ (3N) may be prepared respectively. As the element Z, $Eu_2O_3$ (3N) is prepared.

The respective raw materials are weighed and mixed so that these materials have the mole ratio of the respective elements to be "m:a:b:z=0.985:1:1:0.015".

The weighing and mixing of the raw materials are convenient to be operated in the glove box under an inert atmosphere. This is because if the operation is performed in the atmosphere, the oxygen concentration ratio contained in the host material structure elements is broken by the oxidization or the decomposition of the sample, so that the light emitting characteristic is possible to be deteriorated, and in addition, it is possible to cause a problem of being displaced from the objective composition of the phosphor. Besides, the nitrides of the respective raw material elements are easy to be influenced by moisture, so that it is preferable to use an inert gas from which the moisture is fully removed. When the nitride type raw materials are used as the respective raw material elements, a dry mixing is preferable as the mixing method so as to avoid the decomposition of the raw materials, and it may be a normal dry mixing method using a ball mill, a mortar, or the like.

When the mixture is completed, the raw materials are put into a crucible, and then retained and fired for three hours in the inert atmosphere of nitrogen or the like, at 1000° C. or higher, preferably at 1400° C. or higher, and more preferably at 1500° C. At this time, the material of the crucible to be used is preferable to be the material which is possible to be used in the inert atmosphere such as boron nitride (BN) alumina, carbon, silicon nitride, aluminum nitride, sialon, SiC, and so on, and the purity of the crucible is preferred to be high. For example, the BN crucible in high purity is preferable.

The higher the firing temperature is, the faster the firing proceeds, so the retaining time can be shorten. Even if the firing temperature is low, the objective light emitting characteristic can be obtained by retaining the material for a long time. The longer the firing time is, the more the particle growth proceeds, and the particle size becomes large, so that a desired firing time can be set according to the objective particle size. After the firing is completed, the fired materials are put out of the crucible, and the materials are pulverized to be a predetermined average particle size by using a pulverizing means such as a mortar, a ball mill, or the like to thereby produce the phosphor having the composition formula $CaAlSiN_3$:Eu.

(Application Method for an LED or a Light Source)

When an LED as a light source which emits white light or the like for example is produced by using the powdered phosphor according to the embodiment 2, a BAM:Eu, for example, being a commercially available blue phosphor, and a ZnS:Cu, Al, for example, being a commercially available green phosphor are mixed at a predetermined ratio. The predetermined ratio can be determined by preparing mixed samples of the respective phosphors at the compounding ratio obtained by defining an objective color temperature (for example, 6500 K) and performing the combination simulation of the emission spectrum waveforms of the respective phosphors, and then light emitting the mixed samples and readjusting the mixture ratio from the result of the light emission. The above-described phosphor mixture may be filled to the ultraviolet, ultraviolet to blue, ultraviolet to green, or green LED by the publicly known method. The LED emitting white and other various lights with good color rendering properties can be produced by this way. Also, when other light sources are used instead of the LED, the light sources emitting white and other various lights with good color rendering properties can be produced by the same operation.

Embodiment 3

Next, a phosphor represented by a composition formula $M_mB_bO_oN_n$:$Z_z$ (note that the element M is one or more kind of divalent elements, the element B is one or more kind of tetravalent elements, the O is oxygen, the N is nitrogen, and the element Z is an activator.) according to the present invention will be described with reference to the drawings. In an embodiment 3, two kinds of phosphors when Ca is used as the element M, and when Sr is used as the element M are described.

Figure 3:
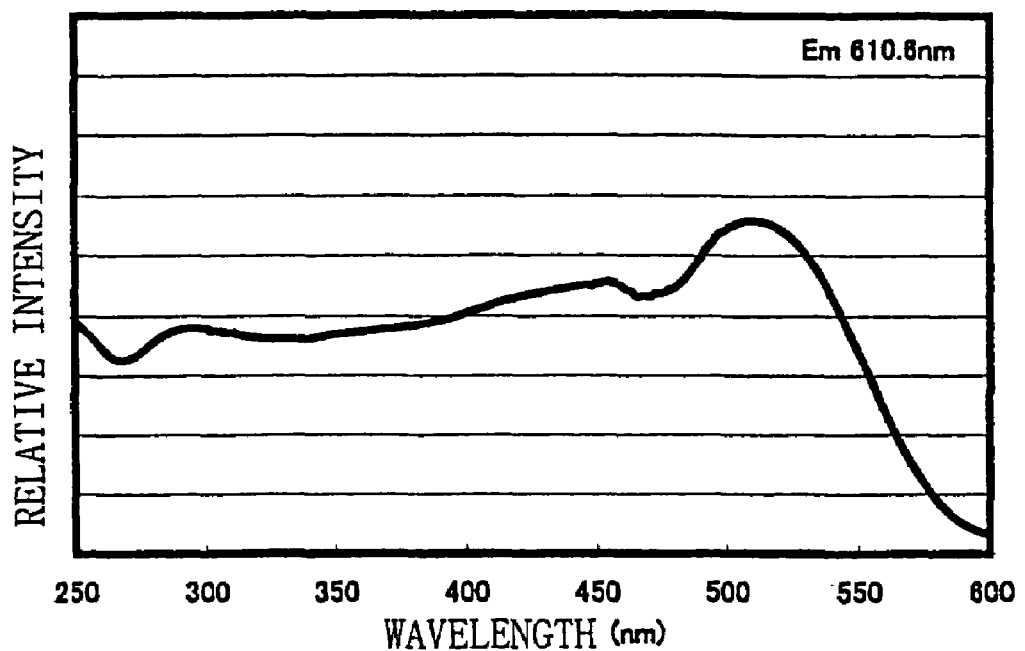
FIG. 3 is a graph showing the excitation spectrum of the phosphor according to the present invention.

First, an excitation light which can be used by an orange phosphor in which Ca is used as the element M according to the embodiment 3 is described with reference to FIG. 3. FIG. 3 is the same kind of graph as the graph of the excitation spectrum described in the embodiment 1, and showing an example ($Ca_{1.31}Si_3O_{1.18}N_{4.58}$:$Eu_{0.041}$) of the orange phosphor in which Ca is used as the element M according to the embodiment 3. (Note that when the phosphor is excited by the excitation light of 460 nm, the emission maximum was 610.6 nm in this embodiment, so that monochromatic excitation lights are irradiated on the phosphor while changing the wavelength sequentially from 250 nm to 600 nm, the intensity of the spectrum being light emitted by the phosphor when the wavelength is 610.6 nm is measured, and the luminescence intensity is plotted.)

As it is obvious from FIG. 3, the orange phosphor in which Ca is used as the element M according to the embodiment 3 also shows a plain light emission at substantially the same luminescence intensity relative to the excitation lights in the range from ultraviolet light of 250 nm to green light of 550 nm similarly to the phosphor according to the embodiment 1.

Next, the light emission of the above-described orange phosphor in which Ca is used as the element M according to the embodiment 3 when it is excited by the excitation light in the range from ultraviolet light of 250 nm to green light of 550 nm is described.

An emission maximum, a relative luminescence intensity, and a value of a half value width of the phosphor in which Ca is used as the element M according to the embodiment 3, when it is excited by the lights having wavelengths of 254 nm, 300 nm, 380 nm, 405 nm, 460 nm, 509.9 nm, and 550 nm as the excitation lights are shown in Table 3.

TABLE 3

| EXCITATION WAVELENGTH (nm) | EMISSION MAXIMUM (nm) | RELATIVE INTENSITY (%) | HALF VALUE WIDTH (nm) |
|---|---|---|---|
| 254.0 | 609.0 | 74.0% | 99.6 |
| 300.0 | 609.1 | 71.2% | 99.6 |

TABLE 3-continued

| EXCITATION WAVELENGTH (nm) | EMISSION MAXIMUM (nm) | RELATIVE INTENSITY (%) | HALF VALUE WIDTH (nm) |
|---|---|---|---|
| 380.0 | 608.1 | 71.4% | 99.5 |
| 405.0 | 609.0 | 75.2% | 99.2 |
| 460.0 | 610.6 | 82.6% | 98.0 |
| 509.9 | 610.9 | 100.0% | 97.1 |
| 550.0 | 614.5 | 62.8% | 95.0 |

As it is obvious from measured results shown in Table 3, when the lights having wavelengths from 250 nm to 550 nm are sequentially irradiated on the phosphor as a monochromatic excitation light, the maximum of luminescence intensities is defined as $P_H$, and the minimum of luminescence intensities e is defined as $P_L$. When the wavelength of the excitation light is 509.9 nm, the emission maximum becomes 610.9 nm, and the luminescence intensity becomes a maximum value. Therefore, the value at this time is set as $P_H$=100%. On the other hand, when the wavelength of the excitation light is 550 nm, the emission maximum becomes 614.5 nm, and the luminescence intensity becomes a minimum value. Then, the value at this time is $P_L$=62.8%. Therefore, $P_H/P_L$=1.59, and when a case that the excitation light is used to provide a maximum efficiency to the phosphor is compared to a case that the excitation light is used to provide a minimum efficiency, the difference between both efficiencies is within 40%. Thus, it turned out that the phosphor can fully use the wide range of lights effectively from ultraviolet light to green light as the excitation lights. Further, it turned out that the half value width is 95 nm or more relative to the excitation lights having wavelengths from 250 nm to 550 nm.

That is to say, it turned out that the orange phosphor in which Ca is used as the element M according to the embodiment 3 can also use various light sources emitting any one of the lights from ultraviolet light to green light as a light source for excitation similarly to the phosphors according to the embodiment 1 and the embodiment 2. Further, when it is used by mixing with other color phosphors emitting other color lights, it can be used in the wide range, flexibly, by mixing with other color phosphors having various excitation spectra respectively. By a combination with the various light sources and other color phosphors, white light and other various lights having good color rendering properties can be obtained.

Figure 4:
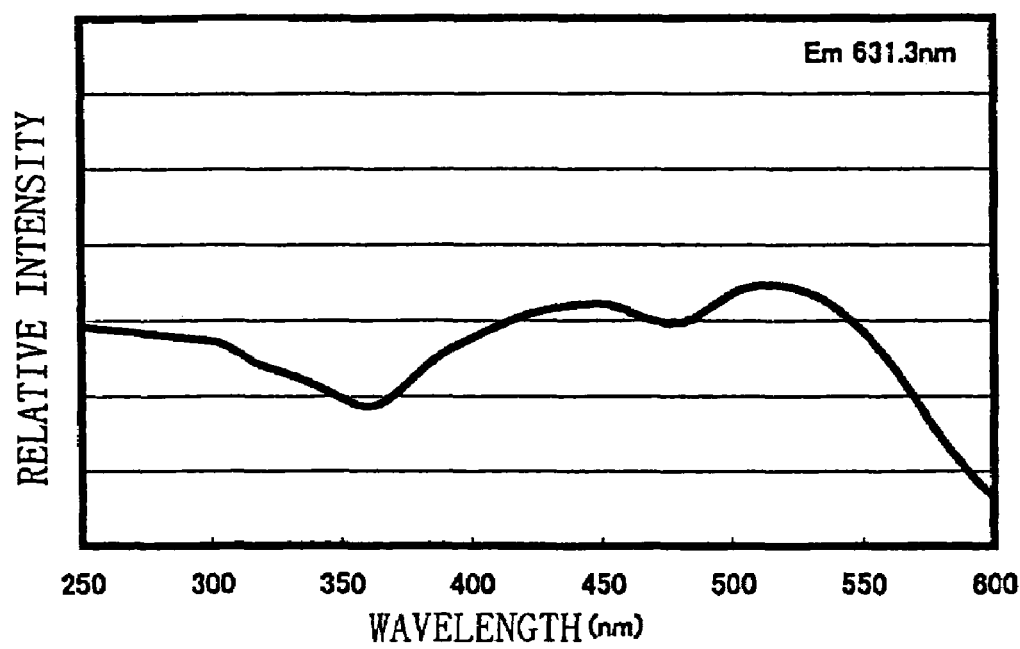
FIG. 4 is a graph showing the excitation spectrum of the phosphor according to the present invention.

Furthermore, an excitation light which can be used by an orange phosphor in which Sr is used as the element M according to the embodiment 3 is described with reference to FIG. 4. FIG. 4 is the same kind of graph as the graph of the excitation spectrum described in the embodiment 1, and showing an example ($Sr_{2.86}Si_3O_{4.17}N_{3.28}$:$Eu_{0.088}$) of the red phosphor in which Sr is used as the element M according to the embodiment 3. (Note that when the phosphor is excited by the excitation light of 460 nm, the emission maximum was 631.3 nm in this embodiment, so that monochromatic excitation lights are irradiated on the phosphor while changing the wavelength sequentially from 250 nm to 600 nm, the intensity of the spectrum being light emitted by the phosphor when the wavelength of 631.3 nm is measured, and the luminescence intensity is plotted.)

As it is obvious from FIG. 4, the orange phosphor in which Sr is used as the element M according to the embodiment 3 shows a plain light emission at substantially the same luminescence intensity relative to the excitation lights in the range from ultraviolet light of 250 nm to green light of 550 nm similarly to the phosphor according to the embodiment 1.

Next, the light emission of the above-described orange phosphor in which Sr is used as the element M according to the embodiment 3, when it is excited by the excitation light in the range from ultraviolet light of 250 nm to green light of 550 nm is described.

An emission maximum, a relative luminescence intensity, and a value of a half value width of the phosphor in which Sr is used as the element M according to the embodiment 3, when it is excited by the lights having wavelengths of 254 nm, 300 nm, 380 nm, 405 nm, 460 nm, 514.8 nm, and 550 nm as the excitation lights are shown in Table 4.

TABLE 4

| EXCITATION WAVELENGTH (nm) | EMISSION MAXIMUM (nm) | RELATIVE INTENSITY (%) | HALF VALUE WIDTH (nm) |
|---|---|---|---|
| 254.0 | 631.3 | 81.0% | 95.6 |
| 300.0 | 631.3 | 76.2% | 96.6 |
| 380.0 | 628.7 | 65.1% | 94.0 |
| 405.0 | 631.2 | 79.9% | 95.0 |
| 460.0 | 631.3 | 90.1% | 94.7 |
| 514.8 | 631.2 | 100.0% | 94.2 |
| 550.0 | 632.8 | 83.2% | 93.5 |

As it is obvious from measured results shown in Table 4, when the lights having wavelengths from 250 nm to 550 nm are sequentially irradiated on the phosphor as a monochromatic excitation light, the maximum of luminescence intensities is defined as $P_H$, and the minimum of luminescence intensities is defined as $P_L$. When the wavelength of the excitation light is 514.8 nm, the emission maximum becomes 631.2 nm, and the luminescence intensity becomes a maximum value. Therefore, the value at this time is set as $P_H$=100%. On the other hand, when the wavelength of the excitation light is 380.0 nm, the emission maximum becomes 628.7 nm, and the luminescence intensity becomes a minimum value. Then, the value at this time is $P_L$=65.1%. Therefore, $P_H/P_L$=1.54, and when a case that the excitation light is used to provide a maximum efficiency to the phosphor is compared to a case that the excitation light is used to provide a minimum efficiency, the difference between both efficiencies is within 40%. Thus, it turned out that the phosphor can fully use the wide range of lights effectively from ultraviolet light to green light as the excitation lights. Further, it also turned out that the half value width is 93 nm or more relative to the excitation lights having wavelengths from 250 nm to 550 nm.

That is to say, the orange phosphor in which Sr is used as the element M according to the embodiment 3 can use various light sources emitting any one of the lights from ultraviolet light to green light as a light source for excitation similarly to the phosphors according to the embodiment 1 and the embodiment 2 in which Ca is used as the element M. Further, when it is used by mixing with other color phosphors emitting other color lights, it can be used in the wide range, flexibly, by mixing with other color phosphors having various excitation spectra respectively. By the combination with the various light sources and other color phosphors, white light and other various lights having good color rendering properties can be obtained.

Here, a structure of the phosphor according to the embodiment 3 is described.

The phosphor according to the embodiment 3 is the phosphor having a host material structure represented by the general formula $M_mB_bO_oN_n$:Z.

Here, the element M is a divalent element in the phosphor. The element B is Si, the O is oxygen, and the N is nitrogen.

The element Z is an element which acts as an activator in the phosphor. When "m=a+p, b=3, o=a+q, and n=4+r", "a" is in the range of "0 (zero)<a≦10", more preferably, in the range of "0 (zero)<a≦6", "p" is "−a/2<p<a/2", "q" is "−a/2<q<2a", and "r" is "−2<r<2". When the phosphor has such a host material structure, it becomes to be the phosphor with a high emission efficiency.

The element M is preferable to be at least one or more elements selected from Be, Mg, Ca, Sr, Ba, Zn, Cd, and Hg, and moreover, it is preferable to be at least one or more elements selected from Mg, Ca, Sr, Ba, and Zn. For example, it can be a single Ca, or a mixture of Ca, Sr, and so on.

The element Z being the activator is preferable to be at least one or more elements selected from rare-earth elements or transition metal elements. By the element M and the element Z taking the above-described structure, the emission efficiency of the phosphor becomes higher.

When the element Z being the activator is at least one or more elements selected from Eu, Ce, and Mn, the emission efficiency of the aforementioned phosphor becomes higher and it is the more preferable composition.

In addition, when the element Z is Eu, the emission wavelength of the phosphor shows an orange wavelength, so that the orange based phosphor for white light emitting unit with a good emission efficiency can be obtained, therefore it is a preferable composition.

Here, when the element M is Ca and/or Sr, and the element Z is Eu, it is easy to obtain the raw materials, an environmental load is low, and furthermore the emission wavelength of the phosphor shows orange wavelength, so that the orange based phosphor capable of producing the white light emission with the good emission efficiency can be obtained. Therefore it is a preferable composition.

In the phosphor according to the embodiment 3, the additive amount of the element Z is preferable to be in a range of 0.0001 mole or more and 0.5 mole or less relative to 1 mole of the corresponding element M. When the additive amount of the element Z is within the aforementioned range, the deterioration of the emission efficiency due to the concentration quenching caused by the excessive content of the activator Z can be avoided. At the same time, the deterioration of the emission efficiency due to the insufficient amount of light emission contributing atoms caused by the insufficient content of the activator can also be avoided. Depending on the kind of the activator element Z to be added, the optimum amount of the element Z to be added is somewhat different. But more preferably, when it is in the range of 0.0005 mole or more and 0.1 mole or less, the high emission efficiency can be obtained.

The phosphor obtained in the embodiment 3 emits a light by receiving a light of wide excitation range from 250 nm to 550 nm, so that by the combination with the light sources which emit ultraviolet to green lights, light sources emitting white and other various lights with good color rendering properties can be produced.

Besides, the phosphor obtained in the embodiment 3 emits a light by receiving a light of wide excitation range from 250 nm to 550 nm, so that, by the combination with the LED light emitting portion emitting ultraviolet to green lights, the LED emitting white and other various lights with good color rendering properties can be produced.

The producing method of the phosphor according to the embodiment 3 is described by the production of the phosphor in which the element M is Ca, the element B is Si, and the element Z is Eu as an example.

As raw materials of Ca being the element M, the oxide, carbonate, hydroxide, and nitride of Ca can be used. As raw materials of Si being the element B, $Si_3N_4$ and $SiO_2$ can be preferably used. As raw materials of nitrogen, $Si_3N_4$ or the nitride of the element M (for example, the nitride of Ca) can be preferably used. As raw materials of Eu being the element Z, $Eu_2O_3$ can be preferably used. The respective raw materials may be commercially available raw materials. Since they are preferred to have high purity, raw materials of 2N or higher, or more preferably 3N or higher are prepared.

In the production of the phosphor in which the element M is Ca, the chemical compounds such as CaO (3N), $CaCO_3$ (3N), $Ca(OH)_2$ (3N), and so on may be prepared as the raw materials of the element M. $Eu_2O_3$ (3N) may be prepared as the raw material for the element Z. $Si_3N_4$ (3N) may be prepared as the raw materials of Si and N.

In the compounding of these raw materials, the respective raw materials are weighed, for example, to have a mole ratio of "CaO:$Si_3N_4$:$EU_2O_3$=1.2125:1:0.01875". To mix the weighed raw materials, a normal mixing method using a mortar and so on may be used. The mixture can be performed in the atmosphere, but when CaO and $Ca(OH)_2$ are used as the raw materials, they may react to the moisture and carbon dioxide in the atmosphere, and the conformation change can happen, or $Si_3N_4$ of the raw material may be oxidized by oxygen in the atmosphere, so that the mixture is preferable to be performed under an inert atmosphere from which the moisture is removed. For example, operation in a glove box under the inert atmosphere is convenient. The inert gas from which the moisture is fully removed is good to use. When the nitride type raw materials are used as the respective raw material elements, a dry mixing is preferable as the mixing method so as to avoid the decomposition of the raw materials, and it may be a normal dry mixing method using a ball mill, a mortar, or the like.

When the mixture is completed, the raw materials are put into a crucible, and then retained and fired for 24 hours in the inert atmosphere of nitrogen or the like, at 1000° C. or higher, preferably at 1400° C. or higher, and more preferably at 1600° C. The material of the crucible to be used is preferable to be a material which is possible to be used in the inert atmosphere such as boron nitride (BN), alumina, carbon, silicon nitride, aluminum nitride, sialon, SiC, and so on, and the purity of the crucible is preferred to be high. For example, the BN crucible in high purity is preferable.

The higher the firing temperature is, the faster the firing proceeds, so the retaining time can be shorten. Even if the firing temperature is low, the objective light emitting characteristic can be obtained by retaining the material for a long time. The longer the firing time is, the more the particle growth proceeds, and the particle size becomes large, so that a desired firing time can be set according to the objective particle size. After the firing is completed, the fired materials are put out of the crucible, and the materials are pulverized to be a predetermined average particle size (preferably from 20 μm to 0.1 μm) by using a pulverizing means such as a mortar, a ball mill, or the like to thereby obtain the phosphor in which the element M is Ca. As a result of a chemical composition analysis of the produced phosphor, it was $Ca_{1.31}Si_3O_{1.18}N_{4.58}:Eu_{0.041}$.

As for the production method of the phosphor according to the above-described embodiment 3, the firing temperature and the rising and lowering temperature speed are changed, the respective types of samples are prepared while substituting the element M to Sr or the like other than Ca and substituting the element Z to Mn or the like other than Eu, and while selecting the element M and the element Z, the tolerance range of the displacement in the composition ratio of the host material structure of the phosphor is examined.

As a result, when the host material structure of the phosphor is represented by the general formula $M_{a+p}Si_3O_{a+q}N_{4+r}:Z$, "a" is in the range of "0 (zero)<a≦10", more preferably in the range of "0 (zero)<a≦6", "p" is in the range of "−a/2<p<a/2", "q" is in the range of "−a/2<q<2a", and "r" is in the range of "−2<r<2", the phosphor is turned out to show a good emission efficiency.

The values of "a", "p", "q", and "r" can be controlled by the amount of oxygen and nitrogen contained in the oxide, carbonate, hydroxide, and nitride of the element M being the raw materials of the element M, and the amount of oxygen and nitrogen contained in $Si_3N_4$, $SiO_2$ being the raw materials of Si. Therefore, by examining the compounding of the respective raw materials while the host material structure of the phosphor being the objective of production is taken into consideration, the phosphor having a predetermined host material structure can be produced.

As described above, the produced phosphor is used in the combination with the appropriate light emitting portion such as the LED and so on. Therefore, the phosphor is preferable to be a powder form that is easy in the operation of coating or filling, and so on. Here, the phosphor according to the embodiment 3 does not include aluminum easy to be affected by the oxidization at the component part being a bone of the host material structure, and the phosphor has a good resistance to oxidation because it contains oxygen. Therefore it is not required to control the atmosphere to be the inert atmosphere or the like, and it is easy to pulverize the materials into the predetermined particle size in the atmosphere. Here, from the point of view of the emission efficiency, the average particle size of the phosphor is preferable to be 20 μm or smaller, and when the average particle size is 0.1 μm or larger, it is easy to pulverize the materials by using a publicly known pulverizing method.

(Application Method for an LED or a Light Source)

When an LED as a light source which emits white light or the like for example is produced by using the powdered phosphor according to the embodiment 3, a BAM:Eu, for example, being a commercially available blue phosphor and, a ZnS:Cu, Al, for example, being a commercially available green phosphor are mixed at a predetermined ratio. The predetermined ratio can be determined by preparing mixed samples of the respective phosphors at the compounding ratio obtained by defining an objective color temperature (for example, 6500 K) and performing the combination simulation of the emission spectrum waveforms of the respective phosphors, and then light emitting the mixed samples, and readjusting the mixture ratio from the result of the light emission. The above-described phosphor mixture may be filled to the ultraviolet, ultraviolet to blue, ultraviolet to green, or green LED by the publicly known method. The LED emitting white and other various lights with good color rendering properties can be produced by this way. Also, when other light sources are used instead of the LED, the light sources emitting white and other various lights with good color rendering properties can be produced by the same operation.

COMPARATIVE EXAMPLE 1

Next, a phosphor of the comparative example 1 which is represented by the composition formula $Y_2O_2S:Eu$ according to the prior art is described with reference to the drawing.

Figure 5:
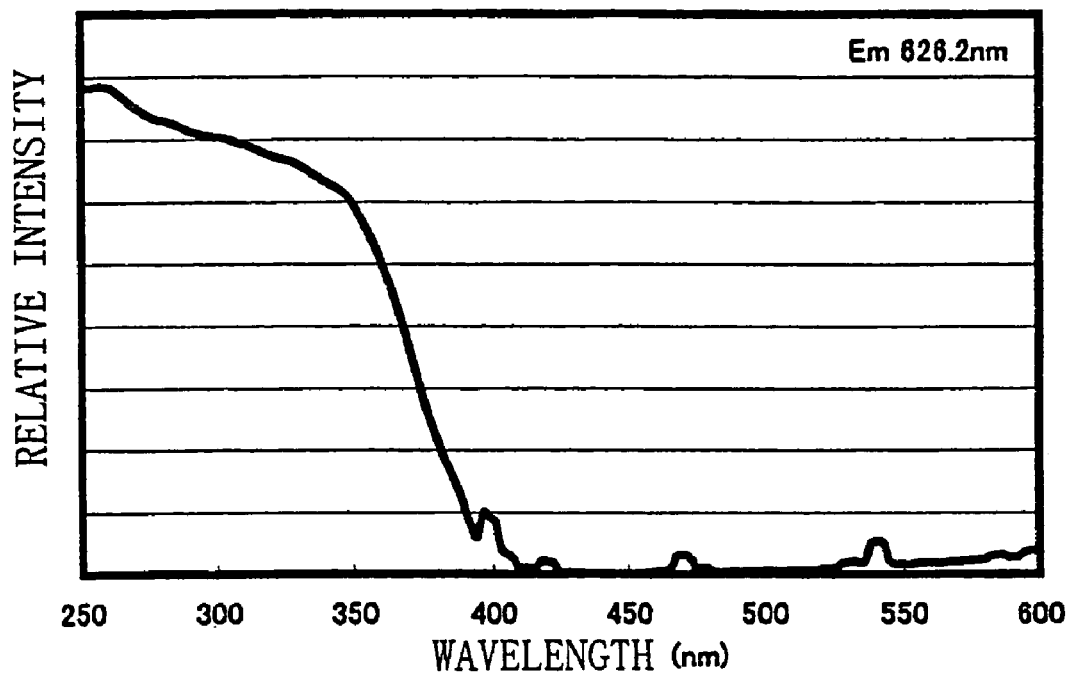
FIG. 5 is a graph showing an excitation spectrum of a phosphor according to the prior art.

First, an excitation light which can be used by a red phosphor according to the comparative example 1 is described with reference to FIG. 5. FIG. 5 is the same kind of graph as the graph of the excitation spectrum described in the embodiment 1. (Note that in this comparative example, when the phosphor is excited by an excitation light of 460 nm, the emission maximum was 626.2 nm, so that monochromatic excitation lights are irradiated on the phosphor while changing the wavelength sequentially from 250 nm to 600 nm, the intensity of the spectrum which is light emitted by the phosphor when the wavelength is 626.2 nm is measured, and the luminescence intensity is plotted.)

As it is obvious from FIG. 5, being different from the phosphors in the embodiment 1 to the embodiment 3, it turned out that the red phosphor according to the comparative example 1 shows a plain light emission at substantially the same luminescence intensity relative to the excitation lights in the range from 250 nm to 380 nm of ultraviolet light, but it turned out that it is not excited by the excitation light of visible light region having a wavelength of 380 nm or more.

Next, the light emission when the above-described red phosphor according to the comparative example 1 is excited by the excitation light in the range from ultraviolet light of 250 nm to green light of 550 nm is described.

An emission maximum, a luminescence intensity, and a value of a half value width of the phosphor according to the comparative example 1, when it is excited by the lights having wavelengths of 254 nm, 300 nm, 380 nm, 405 nm, 460 nm, 500 nm, and 550 nm as the excitation lights are shown in Table 5.

TABLE 5

| EXCITATION WAVELENGTH (nm) | EMISSION MAXIMUM (nm) | RELATIVE INTENSITY (%) | HALF VALUE WIDTH (nm) |
| --- | --- | --- | --- |
| 254.0 | 626.6 | 100.0% | 4.9 |
| 300.0 | 626.6 | 89.7% | 4.9 |
| 380.0 | 626.6 | 26.9% | 5.2 |
| 405.0 | 626.2 | 11.6% | 5.2 |
| 460.0 | 626.2 | 0.5% | 5.2 |
| 500.0 | 626.2 | 0.6% | 4.9 |
| 550.0 | 626.2 | 1.9% | 4.8 |

As it is obvious from the measured results shown in Table 5, when the lights having wavelengths from 250 nm to 550 nm are sequentially irradiated on the phosphor as monochromatic excitation lights, the maximum of luminescence intensities is defined as $P_H$, and the minimum of luminescence intensities is defined as $P_L$. When the wavelength of the excitation light is 254 nm, the emission maximum becomes 626.6 nm, and the luminescence intensity becomes a maximum value. Therefore, the value at this time is set as $P_H$=100%. On the other hand, when the wavelength of the excitation light is 500 nm, the emission maximum becomes 626.2 nm, and the luminescence intensity becomes a minimum value. Then, the value at this time is $P_L$=0.60%. Therefore, $P_H/P_L$=167, and when a case that the excitation light is used to provide a maximum efficiency to the phosphor is compared to a case that the excitation light is used to provide a minimum efficiency, the difference between both efficiencies is the value nearly 100%. Therefore it turned out that the phosphor is difficult to use the wide range of lights effectively from ultraviolet light to green light as the excitation lights. Further, it turned out that the half value width is approximately 5 nm relative to the excitation lights having wavelengths from 250 nm to 550 nm.

That is to say, it turned out that the red phosphor according to the comparative example 1 is difficult to use lights in the wide range from ultraviolet light to green light as the excitation light.

COMPARATIVE EXAMPLE 2

Next, a phosphor of a comparative example 2 represented by the composition formula $Ca_2Si_5N_8$:Eu which is described in Patent Document 5 is explained with reference to the drawing.

Figure 6:
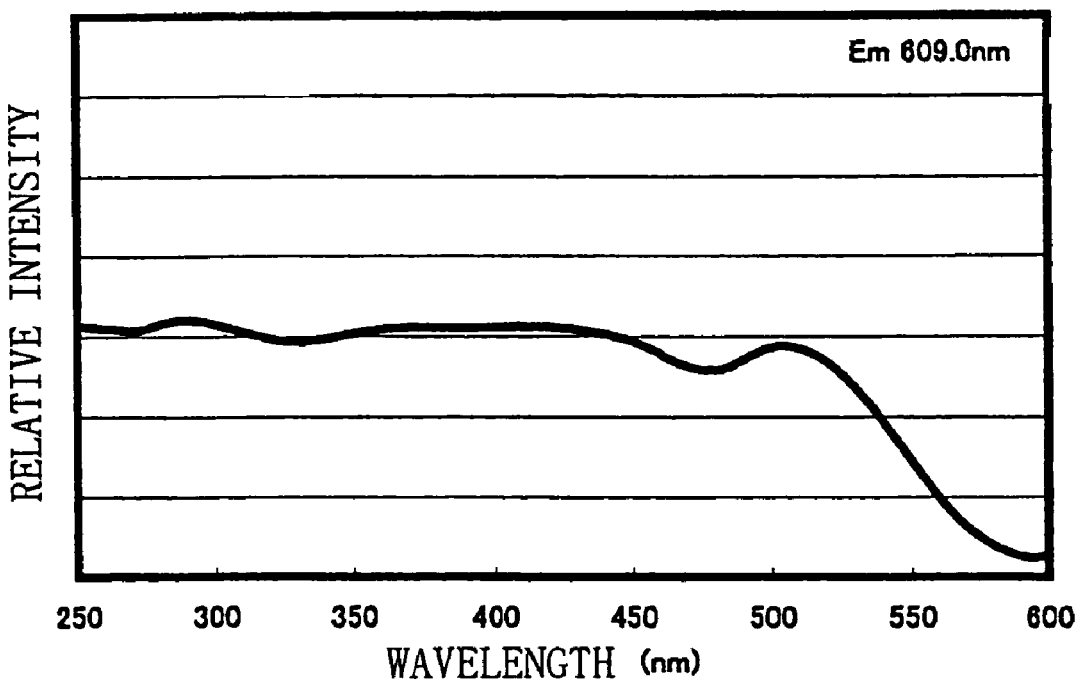
FIG. 6 is a graph showing the excitation spectrum of the phosphor according to the prior art.

First, an excitation light which can be used by the red phosphor according to the comparative example 2 is described with reference to FIG. 6. FIG. 6 is is the same kind of graph as the graph of the excitation spectrum described in the embodiment 1. (Note that in this comparative example, when the phosphor is excited by an excitation light of 460 nm, the emission maximum was 609.0 nm, so that monochromatic excitation lights are irradiated on the phosphor while changing the wavelength sequentially from 250 nm to 600 nm, the intensity of the spectrum which is light emitted by the phosphor when the wavelength is 609.0 nm is measured, and the luminescence intensity is plotted.)

As it is obvious from FIG. 6, being different from the phosphors in the embodiment 1 to the embodiment 3, the red phosphor according to the comparative example 2 shows a plain light emission at substantially the same luminescence intensity relative to the excitation lights in the range from 250 nm to 530 nm of ultraviolet light, but it turned out that the luminescence intensity is deteriorated by the excitation light of green region having a wavelength of 530 nm wavelength or more.

Next, the light emission when the above-described red phosphor according to the comparative example 2 is excited by the excitation light in the range from ultraviolet light of 250 nm to green light of 550 nm is described.

An emission maximum, a luminescence intensity, and a value of a half value width of the phosphor according to the comparative example 2, when it is excited by the lights having wavelengths of 254 nm, 300 nm, 380 nm, 405 nm, 460 nm, 500 nm, and 550 nm as the excitation lights is shown in Table 6.

TABLE 6

| EXCITATION WAVELENGTH (nm) | EMISSION MAXIMUM (nm) | RELATIVE INTENSITY (%) | HALF VALUE WIDTH (nm) |
|---|---|---|---|
| 254.0 | 607.6 | 98.2% | 99.0 |
| 300.0 | 607.6 | 100.0% | 99.1 |
| 380.0 | 609.0 | 97.7% | 98.7 |
| 405.0 | 608.0 | 98.2% | 98.8 |
| 460.0 | 609.0 | 90.0% | 98.7 |
| 500.0 | 609.0 | 91.6% | 98.4 |
| 550.0 | 611.6 | 44.6% | 97.9 |

As it is obvious from measured results shown in Table 6, when the lights having wavelengths from 250 nm to 550 nm are sequentially irradiated on the phosphor as monochromatic excitation lights, the maximum of luminescence intensities is defined as $P_H$, and the minimum of luminescence intensities is defined as $P_L$. When the wavelength of the excitation light is 300 nm, the emission maximum becomes 607.6 nm, and the luminescence intensity becomes a maximum value. Therefore, the value at this time is set as $P_H=100\%$. On the other hand, when the wavelength of the excitation light is 550 nm, the emission maximum becomes 611.6 nm, and the luminescence intensity becomes a minimum value. Then, the value at this time is $P_L=44.6\%$. Therefore, $P_H/P_L=2.2$, and when a case that the excitation light is used to provide a maximum efficiency to the phosphor is compared to a case that the excitation light is used to provide a minimum efficiency, the difference between both efficiencies is 50% or larger. Therefore it turned out that the phosphor is difficult to use the light in the green light range effectively as the excitation lights. Further, it turned out that the half value width is over 97 nm relative to the excitation lights having wavelengths from 250 nm to 550 nm.

From the above description, it turned out that the red phosphor according to the comparative example 2 is difficult to use the light in the green light range as the excitation light.

What is claimed is:

1. A phosphor emitting a light when a monochromatic excitation light in a range from 250 nm to 550 nm is irradiated thereon,
    wherein a luminescence intensity at an excitation wavelength where an intensity of a spectrum of emitting the light by absorbing the excitation light becomes maximum is defined as $P_H$, a luminescence intensity at an excitation wavelength where the luminescence intensity becomes minimum is defined as $P_L$, and $P_H/P_L \leq 2$, and the phosphor is represented by a composition formula MmAaBbOoNn:Z (note that the element M is one or more kind of divalent elements, the element A is one or more kind of trivalent elements, the element B is one or more kind of tetravalent elements, O is oxygen, N is nitrogen, and the element Z is an activator, satisfying o>O, n=2/3m+a+4/3b−2/3o).

2. The phosphor according to claim 1, further satisfying m=a=b=1.

3. A light emitting diode, comprising:
    a phosphor according to claim 2; and
    a light emitting portion emitting any one of ultraviolet to green lights,
    wherein said phosphor is light emitted by any one of the ultraviolet to green lights as an excitation source.

4. A light source, comprising:
    a phosphor according to claim 2; and
    a light emitting portion emitting any one of ultraviolet to green lights,
    wherein said phosphor is light emitted by any one of the ultraviolet to green lights as an excitation source.

5. The phosphor according to claim 1, emitting a light when a monochromatic excitation light in a range from 250 nanometers wavelength to 550 nanometers wavelength is irradiated thereon,
    wherein a light emitting intensity at an excitation wavelength where an intensity of a spectrum of emitting the light by absorbing the excitation light becomes maximum is defined as $P_H$, a light emitting intensity at an excitation wavelength where the light emitting intensity becomes minimum is defined as $P_L$, and $P_H/P_L<2$.

6. A light source, comprising:
    a phosphor according to claim 5; and
    a light emitting portion emitting any one of ultraviolet to green lights,
    wherein said phosphor is light emitted by any one of the ultraviolet to green lights as an excitation source.

7. A light emitting diode, comprising:
    a phosphor according to claim 1; and
    a light emitting portion emitting any one of ultraviolet to green lights,
    wherein said phosphor is light emitted by any one of the ultraviolet to green lights as an excitation source.

8. The light emitting diode according to claim 7, wherein the ultraviolet to green lights are lights of wavelengths from 250 nm to 550 nm.

9. A light source, comprising:
   a phosphor according to claim 1; and
   a light emitting portion emitting any one of ultraviolet to green lights,
   wherein said phosphor is light emitted by any one of the ultraviolet to green lights as an excitation source.

10. The light source according to claim 9, wherein the ultraviolet to green lights are lights of wavelengths from 250 nm to 550 nm.

* * * * *